United States Patent

[11] 3,610,708

| [72] | Inventor | Kurt H. Muecke<br>Calgary, Alberta, Canada |
|---|---|---|
| [21] | Appl. No. | 833,977 |
| [22] | Filed | June 17, 1969 |
| [45] | Patented | Oct. 5, 1971 |
| [73] | Assignee | Flextrac Nodwell Ltd.<br>Alberta, Canada |
| [32] | Priority | June 24, 1968 |
| [33] |  | Canada |
| [31] |  | 023,357 |

[54] GROUSER BAR ASSEMBLY
19 Claims, 3 Drawing Figs.

[52] U.S. Cl. .................................................... 305/35 EB
[51] Int. Cl. .................................................... B62d 55/24
[50] Field of Search ........................................ 305/35 EB,
37, 38, 56, 57

[56] References Cited
UNITED STATES PATENTS

| 2,707,658 | 5/1955 | Grenier | 305/35 EB |
| 2,749,189 | 6/1956 | France | 305/35 EB |
| 3,077,238 | 2/1963 | Nelson | 305/35 EB |
| 3,404,745 | 10/1968 | Smieja | 305/35 EB X |
| 3,165,364 | 1/1965 | Hardman | 305/54 X |

Primary Examiner—Richard J. Johnson
Attorney—Christen & Sabol

ABSTRACT: An improved grouser bar assembly for a tracked vehicle having a belt-type track. The improved grouser bar assembly comprising a grouser bar member for engaging the ground surface and a load distributing member having end supports adapted for securement to the track over the grouser bar member and an intermediate portion extending between the end supports and adapted to be supported by the latter in free spatial relationship above the intermediate portion of the grouser bar member such as to form a wheel engaging surface whereby the vehicle load is transmitted to the grouser bar member through the end supports and hence distributed along the width of the track.

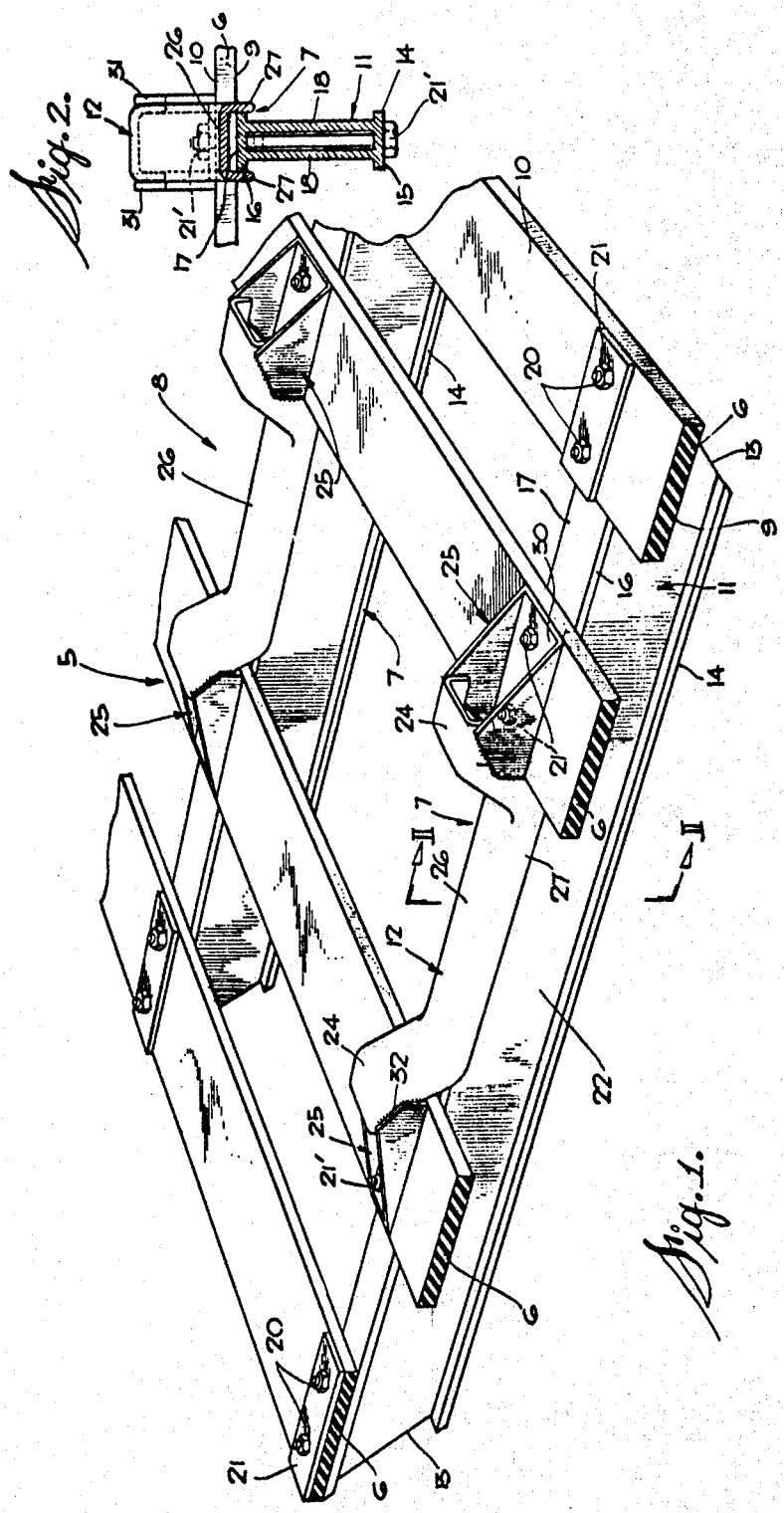

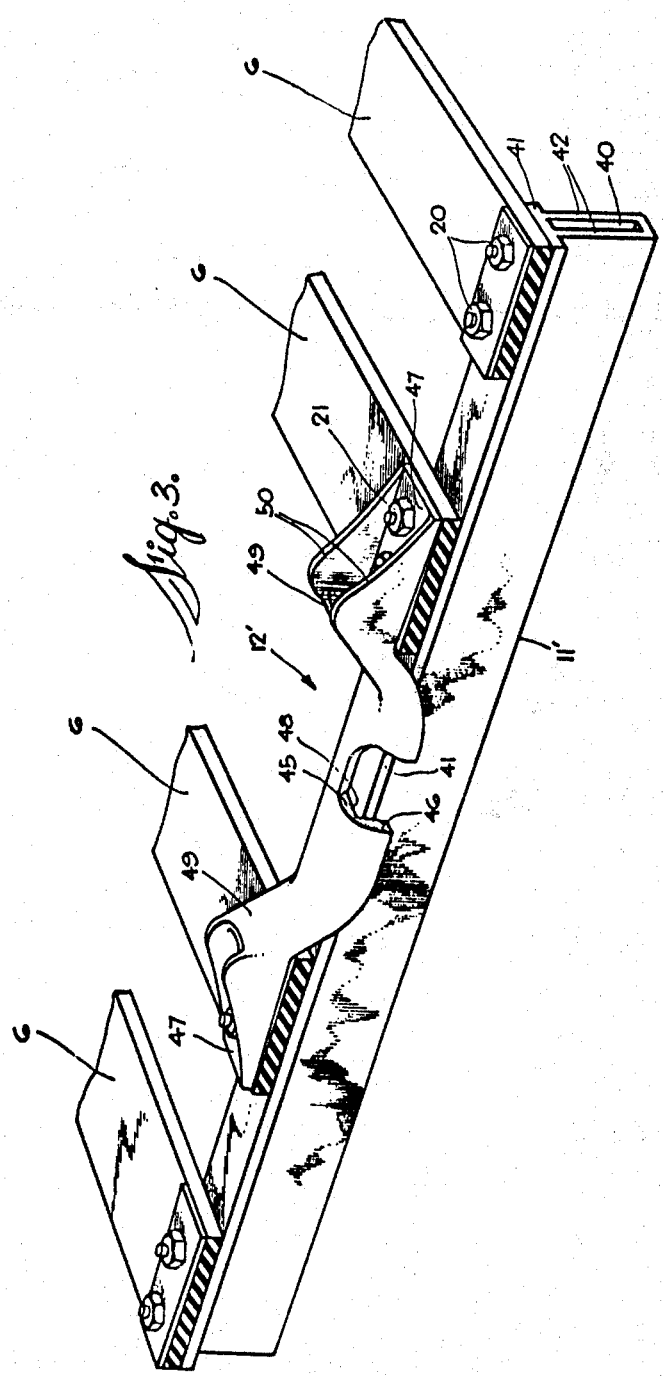

GROUSER BAR ASSEMBLY

This invention relates to a track for track-type vehicles.

Various types of tracks for endless tracked vehicles are known, and one commonly used track is a belt-type track which consists of wide endless belts extending in the longitudinal direction and joined by a plurality of transverse, grouser bars. This latter-mentioned type has found wide use in operations where it is important to have low ground bearing pressure, such as in snow and muskeg areas. Each grouser bar has been usually formed of a single, long piece of steel and forged to provide a central bowed portion for accommodating the wheels of the vehicle. In order to withstand the large bending moment at the midpoint of the grouser bar caused by the weight of the vehicle transmitted to the grouser bar by engagement of the wheels on the middle of the grouser bar, it has been common practice to increase the cross-sectional dimensions of the grouser bar throughout the bowed portion. Thus, this type of grouser bar is of a rather complex configuration, and because each track includes a very large number of grouser bars, the presence of the steel grouser bars adds significantly to the weight of the vehicle.

It is an object of the present invention to provide a grouser bar assembly for a track of the low ground pressure type which is inexpensive to produce and is light in weight so as to be particularly well adapted for use in snow conditions.

According to the present invention, the grouser bar assembly, which is adapted to connect a plurality of flexible members extending longitudinally of the track and defining wheel accommodating longitudinal space between two adjacent flexible members include a grouser bar member having a lower ground engaging surface and an upper surface for contacting the flexible members. The grouser bar member includes an intermediate portion provided to extend across the full width of the longitudinal space. The grouser bar assembly also includes a load distributing member having end support means at each end thereof, the end support means being constructed and arranged for securement to the track over the grouser bar member at opposite sides of the longitudinal space. The load distributing member has an intermediate portion extending between the end support means and arranged to be suspended by the latter above and in free spatial relationship with respect to the intermediate portion of the grouser bar member. The intermediate portion of the load distributing member provides an upper wheel engaging surface so that wheel load which is transmitted to the load distributing member is transferred to the grouser bar member through the end support means at either side of the central portion of the grouser bar member.

It may be appreciated that by distributing the vehicle load, which is transferred to the track by the wheels, away from the intermediate portion and to points on the grouser bar at either side of the intermediate portion of the grouser bar, a high concentrated bending moment at the midpoint of the grouser bar is avoided. Accordingly, the grouser bar member may preferably be formed by a straight member of uniform cross section throughout its entire length.

Preferably, the load distributing member has opposite end portions curved upwardly from its intermediate portion and the end support means includes portions formed onto the upwardly curved end portions of the load distributing member, these support providing portions having lower surfaces for contacting the flexible members. Thus, the intermediate portion of each load distributing member is in effect depressed relative to its end portions so that looking in the longitudinal direction of the track, the load distributing members define a trough for accommodating the vehicle wheels on the track.

Because the grouser bar member may be a straight member of uniform cross section as is described above, it may be economically produced. For example, it may preferably be made from an aluminum alloy extrusion which feature also significantly contributes to the reduction of track weight.

Referring now to the accompanying drawings in which there is shown an embodiment of the present invention, by way of example:

FIG. 1 is a top perspective view of a short length of the vehicle track;

FIG. 2 is a cross section view of the grouser bar assembly as seen from the line II—II of FIG. 1; and FIG. 3 is a top perspective of an alternative embodiment of a grouser bar assembly, a portion of the load distributing members being cast away for the sake of clarity.

Reference numeral 5 generally denote the vehicle track of the present invention, which, it is understood, is of the endless track type for encompassing a plurality of tandem wheels of the vehicle. Track 5, as illustrated in the drawings, is designed to provide exceptionally good snow operation, and instead of utilizing a pair of wide endless flexible members or belts as is common practice, track 5 includes four belts 6 which are formed of rubber or like material and may include reinforcing elements. Each belt, which is a closed loop and may be formed by splicing a length of belt material, extends in the longitudinal direction of the track. The four belts are joined by a plurality of transverse grouser bar assemblies 7, two of which are shown in FIG. 1.

Two of the belts 6 are located at either side of a central wheel accommodating space 8 and the two belts at each side of the central space are also spaced so that track 5 is of considerable width. Each belt presents a bottom surface 9 and a top surface 10.

Each grouser bar assembly 7 includes a grouser bar member 11 and a load distributing member 12. The grouser bar member 11 is preferably formed from an aluminum alloy extrusion so as to provide a uniform cross section substantially throughout its length. The ends of the grouser bar member may be cut at an angle, however, to provide a downward and inward taper as shown in FIGS. 1 at 13, 13. The cross-sectional shape of the extrusion from which the grouser bar member is formed is preferably selected, of course, to provide a good strength-weight ratio, and one such shape is illustrated in FIG. 2. The grouser bar member has a lower lateral flange 14 providing a lower ground engaging surface 15 and an upper lateral flange 16 providing a top belt engaging surface 17. Formed integrally with flanges 14 and 16 are intermediate parallel webs 18, 18 which are of sufficient height to give the grouser bar member significant depth. Webs 18, 18 are spaced so that the grouser bar member is in effect hollow. At opposite ends, the grouser bar member is secured to the outermost belts 6 by way of bolts 20 which pass through aligned holes in the flange 16 and the belt. Small plates 21 are placed against the top surface 10 of the outermost belts 6 and also have holes aligned with those in the belt so as to receive bolts 20. The bolts 20 may have T-head (not shown) so as to be received between the webs 18, 18 and bears against the bottom of upper flange 16.

Load distributing members 12 span the central space 8 between innermost belts 6 and overlie central portions 22 of grouser bar members 11. The load distributing members also function as wheel guides on the track in that each load distributing member 12 has a low horizontal central portion 23 between upturned end portions 24, 24, which are carried by end support means 25 resting on the top surface 10 of the innermost belts 6. Thus, looking in the longitudinal direction of the track, the load distributing member defines a wheel accommodating trough along the central space of track. As may be best seen in FIG. 2, the load distributing member 12 is of inverted U-shape in cross section, this shape being defined by a wheel engaging base portion 26 with a pair of downwardly depending side flanges 27, 27 formed integrally therewith. Throughout its central portion the flanges 27, 27, which are parallel, project downwardly adjacent the sides of the grouser bar member and are juxtaposed the side edges of the upper lateral flange 16 of the grouser bar member to thereby help retain the grouser bar members upright under the belts. The load distributing member 12 is preferably suspended, however, so that the bottom surface of wheel engaging portion 26 throughout the central portion of the load distributing member is spaced above the top surface 17 of the grouser bar member in order that none of the wheel load, which is transferred to the load distributing member, is transmitted to the grouser bar member along its central portion extending across space 8.

The load supporting means 25 at either end of the load distributing member 12 consists of a bracket 29 which is channel-shaped or of U-shape in cross section defined by a base portion 30 and a pair of upwardly projecting flanges 31, 31. The upwardly projecting flanges 31, 31 are spaced to receive therebetween downwardly projecting flanges 27, 27, of the upturned end portion 24 of the load distributing member so that the flanges of the load distributing member and the bracket overlap. The load distributing member is secured to the bracket at either end by welds 32. The bottom of base portion 30 of each bracket provides a belt engaging surface which rests on the top surface of the belt 6 at either side of the central space 8. Base portion 30 has openings therein which align with holes in the belt 6 and aligned holes in lower flange 14 and upper flange 16 of the grouser bar member 11. Bolts 21', which have heads in engagement with the bottom surface 15 of the grouser bar member 11 extends through the space between webs 18, 18 and the aligned holes in the flanges of grouser bar member 11, in the belt 6 and the base portion 30 (FIG. 2), connect together the grouser bar member 11, load distributing member and the belts on either side of central space 8.

The entire weight of the vehicle and its load is transmitted to the load distributing members 12 as the wheels engage the top of wheel engaging portions 26. However, since the wheel engaging portions 26 do not rest on top surface 17 of the grouser bars due to the fact the central portions 23 are rigid and are suspended between end support means 25, 25, the weight is well distributed over the track. All weight is transferred through the brackets 29, 29, which are located over the grouser bar member 11 at points located a substantial distance either side of the midpoint of the grouser bar member 11. Thus, since a high concentrated load at the middle of the grouser bar is avoided the bending moment is substantially reduced. Because of this and due to the fact the load distributing member is shaped to provide a wheel accommodating trough, the use of a grouser bar member of uniform cross section is made possible. Moreover, as is stated, the grouser bar member may be made of a light aluminum alloy extrusion. By utilizing a grouser bar member formed of aluminum alloy, a track of considerable width such as that shown, and yet of light weight, is possible. A grouser bar member of the extruded shape illustrated and which has a significant depth so as to project below the belts, across the width of the track functions effectively as a snow traction cleat. Accordingly, the track of the present invention is well suited for operation over snow and functions with minimum disturbance of the snow texture and provides good traction.

Referring now to the embodiment of the invention shown in FIG. 3, elements which are the same as those of the previously described embodiment bear like reference numerals. Grouser bar member 11', however, is T-shaped in cross section, this shape being defined by a vertical leg portion 40 and a top horizontal flange 41. Like grouser bar member 11, member 11' may be hollow in that leg portion 40 is actually formed by a pair of spaced webs 42, 42 joined along their lower edges. The T-shape of grouser bar member 11' has been found desirable because it causes little snow disturbance and remains relatively clean when operating in wet snow.

Unlike grouser bar member 11, the ends of grouser bar member 11' are not tapered. The square ends of grouser bar member 11' provide the advantage of improving the resistance of the track to side slip.

Load distributing member 12' is a unitary member formed by casting and defines a central concave upper surface which again serves as a wheel guide. The central portion of load distributing member 12' is of inverted U-shape in cross section, this shape being defined by a horizontal part 45 and downwardly depending flanges 46 which project downwardly adjacent opposite side edges of the horizontal flange 41.

At opposite ends of the central portion of the load distributing member 12' flat plate portions 47, 47 provide the support means which rest on the top surfaces of the belts 6. Preferably, flat plate portions 47, 47 are cast substantially coplanar with the horizontal part 45 of the central portion so that when flat plate portions 47, 47 rest on top of the belts, bottom surface 48 of horizontal part 45 is held significantly above the top surface of horizontal flange 41. Grouser bar member 11', belts 6, and flat plate portions 47 have aligned openings and are clamped together with bolts 21 with belts 6 being clamped between flat plate portion 47 and the top surface of the grouser bar member 11'.

The concave surface, which defines the wheel guide, is formed by the upper wheel engaging surface of horizontal part 45 and upwardly inclined portions 49, 49 which continue smoothly upward from either end of the central portion. Projecting upwardly from side edge of each flat plate portions 47, are vertical side flanges 50, 50, and each of the inclined portions 49 project outwardly over the flat plate portion 47 and are joined between side flanges 50, 50.

The cast load distributing member 12' described above provides a rigid structure having good wear characteristics.

It is apparent various other modifications to the present invention as described above could be made without departing from the spirit of the invention as defined in the appending claims.

The embodiments of the invention in which an exclusive property or privilege is claimed are defined as follows:

1. A grouser bar assembly for a vehicle track of the type having a plurality of spaced transverse grouser bar assemblies connecting a plurality of parallel flexible members extending longitudinally of the track and defining a wheel accommodating longitudinal space between two adjacent flexible members, said grouser bar assembly comprising a grouser bar member having a lower ground engaging surface and an upper surface for contacting said flexible members, said grouser bar member including an intermediate portion provided to extend across the full width of said longitudinal space, and a load distributing member having end support means at each end thereof and being constructed and arranged to be fixed onto and exclusively supported by said two adjacent flexible members, for securement to said track over said grouser bar member at opposite sides of said longitudinal space, said load distributing member having an intermediate portion extending between said end support means and arranged to be suspended by the latter in free spatial relationship coextensive with the width of said longitudinal space above and with respect to said intermediate portion of said grouser bar member, the intermediate portion of the load distributing member forming an upper wheel engaging trough, whereby wheel load transmitted to said load distributing member is transferred to said grouser bar member exclusively through said end support means and to said two adjacent flexible members at either side of said intermediate portion of said grouser bar member.

2. A grouser bar assembly as defined in claim 1, wherein the grouser bar member is a straight member of uniform cross section substantially throughout the entire length thereof.

3. A grouser bar assembly as defined in claim 1, wherein the intermediate portion of the load distributing member has opposite end portions curved upwardly and outwardly, and wherein said end support means include brackets secured to the upwardly curved end portions of said intermediate portion of the load distributing member, said brackets having lower surfaces for contacting said flexible members.

4. A grouser bar assembly as defined in claim 3, wherein said intermediate portion of said load distributing member is of inverted U-shape cross section to provide a pair of spaced downwardly projecting flanges straddling the intermediate portion of said grouser bar member.

5. A grouser bar assembly as defined in claim 1, wherein said intermediate portion and said end support means of said load distributing member are cast as a unitary member and define a concave upper surface providing a wheel guide.

6. A grouser bar assembly as defined in claim 5, wherein said intermediate portion of said load distributing member is of inverted U-shape cross section, the U-shape being defined by a horizontal part and downwardly depending side flanges formed integrally with the horizontal part, said horizontal part defining said upper wheel engaging surface and having a bottom surface to be spaced above said grouser bar member.

7. A grouser bar assembly as defined in claim 5, wherein said grouser bar member is a straight member of uniform cross section throughout the length thereof, said uniform cross section being T-shaped defined by a vertical leg and a top horizontal flange, said side flanges of said load distributing member being spaced to project downwardly adjacent opposite side edges of said horizontal flange.

8. A grouser bar assembly as defined in claim 6, wherein said end support means of said load distributing member include a pair of flat plate portions at opposite ends of said intermediate U-shaped portion for engagement with the top surfaces of said flexible members, said flat plate portions and grouser bar member having aligned openings for receiving bolt means for clamping said load distributing member to said grouser bar member with said flexible members sandwiched between said top surface of said grouser bar member and said flat plate portions of said load distributing member.

9. A grouser bar assembly as defined in claim 8, wherein said flat portions are substantially coplanar with said horizontal part of said intermediate U-shaped portion of said load distributing member, and wherein said concave upper surface defining said wheel guide is formed by the upper wheel engaging surface on said horizontal part and upwardly inclined portions at each end of said intermediate U-shaped portion of said load distributing member.

10. A grouser bar assembly as defined in claim 9, wherein each of said flat plate portions has a pair of upwardly extending side flanges, and wherein each inclined portion projects over said flat plate portions and is formed between the pair of side flanges.

11. A vehicle track including a plurality of endless belts having top and bottom surfaces and a plurality of grouser bar assemblies; said belts extending longitudinally of the track and providing a wheel accommodating central longitudinal space between two adjacent belts; at least one grouser bar assembly comprising a transverse grouser bar member having a ground engaging bottom surface and a top surface in engagement with said bottom surface of said belts, said grouser bar member having a central portion extending across the full width of said central space, a load distributing member associated with said grouser bar member, said load distributing member having end support means at opposite ends thereof and being constructed and arranged to be fixed onto and exclusively supported by said adjacent belts over the associated grouser bar member and a central U-shaped portion suspended by said end support means in free spatial relationship coextensive with the width of said longitudinal space above and with respect to said central portion of said grouser bar member means connecting said grouser bar member and said load distributing member to said belts, said central U-shaped portion of said load distributing member forming an upper wheel engaging trough extending transversely over said central longitudinal space, whereby wheel load transmitted to said load distributing member is transferred to said grouser bar member only through said end support means at either side of said central portion of the grouser bar member.

12. A vehicle track as defined in claim 11, wherein said central U-shaped portion of said load distributing member is substantially straight between upturned end portions, and wherein said end support means includes bracket means fixed to said upturned end portions and engaging the top surfaces of said belts at opposite sides of said central space of said track.

13. A vehicle track as defined in claim 11, wherein said grouser bar member is of uniform cross section substantially throughout the length thereof.

14. A vehicle track as defined in claim 11, wherein the central portion of said load distributing member is provided with a wheel engaging base portion having an inverted U-shape cross section defining a pair of integrally formed spaced flanges, said base portion being spaced above said top surface of said grouser bar member and said flanges projecting downwardly adjacent opposite sides of said grouser bar member.

15. A vehicle track as defined in claim 11, wherein said grouser bar member in cross section has a vertically disposed web means formed integrally with a lateral top flange defining said top surface of said grouser bar member, and wherein the central U-shaped portion of said load distributing member is provided with a wheel engaging base portion having an inverted U-shape cross section defining a pair of integrally formed spaced flanges, said base portion of said load distributing member being spaced above said lateral flange and said flanges of said load distributing member projecting downwardly adjacent opposite side edges of said lateral flange, whereby said lateral flange of said grouser bar member at the central portion thereof is received within the inverted U-shaped cross section of said load distributing member.

16. A vehicle track as defined in claim 11, wherein said grouser bar member is an elongated element formed from an aluminum alloy extrusion.

17. A vehicle track as defined in claim 12, wherein said load distributing member is of inverted U-shape cross section and thereby provides a pair of spaced, downwardly projecting flanges straddling said grouser bar member along the central portion thereof, and wherein each of said bracket means has a U-shaped cross section defined by a base portion and a pair of upwardly projecting flanges, the upwardly projecting flanges of each bracket means overlapping with the downwardly projecting flanges of the inverted U-shaped load distributing member at the upturned end portion, the overlapping flanges of said bracket means and said load distributing member being fixed together.

18. A vehicle track as defined in claim 17, wherein said base portion of each bracket means has a belt engaging bottom surface, wherein the belt at either side of the central space is sandwiched between said top surface of said grouser bar member and said bottom surface of said bracket means, and wherein the means connecting said grouser bar member and load distributing member to said belts includes common bolt means passing through aligned openings in said base portion of the bracket means, said grouser bar member and the belt sandwiched therebetween.

19. A vehicle track as defined in claim 17, wherein said belts consist of four separate belt members, two belts being located in spaced relationship on each side of said central space, wherein said base portion of each bracket means contacts the top surface of the belt immediately adjacent said central portion, and wherein said means connecting the grouser bar member and load distributing member to said belts includes bolt means securing said bracket means to said grouser bar member with the belt immediately adjacent the central space clamped therebetween.